UNITED STATES PATENT OFFICE.

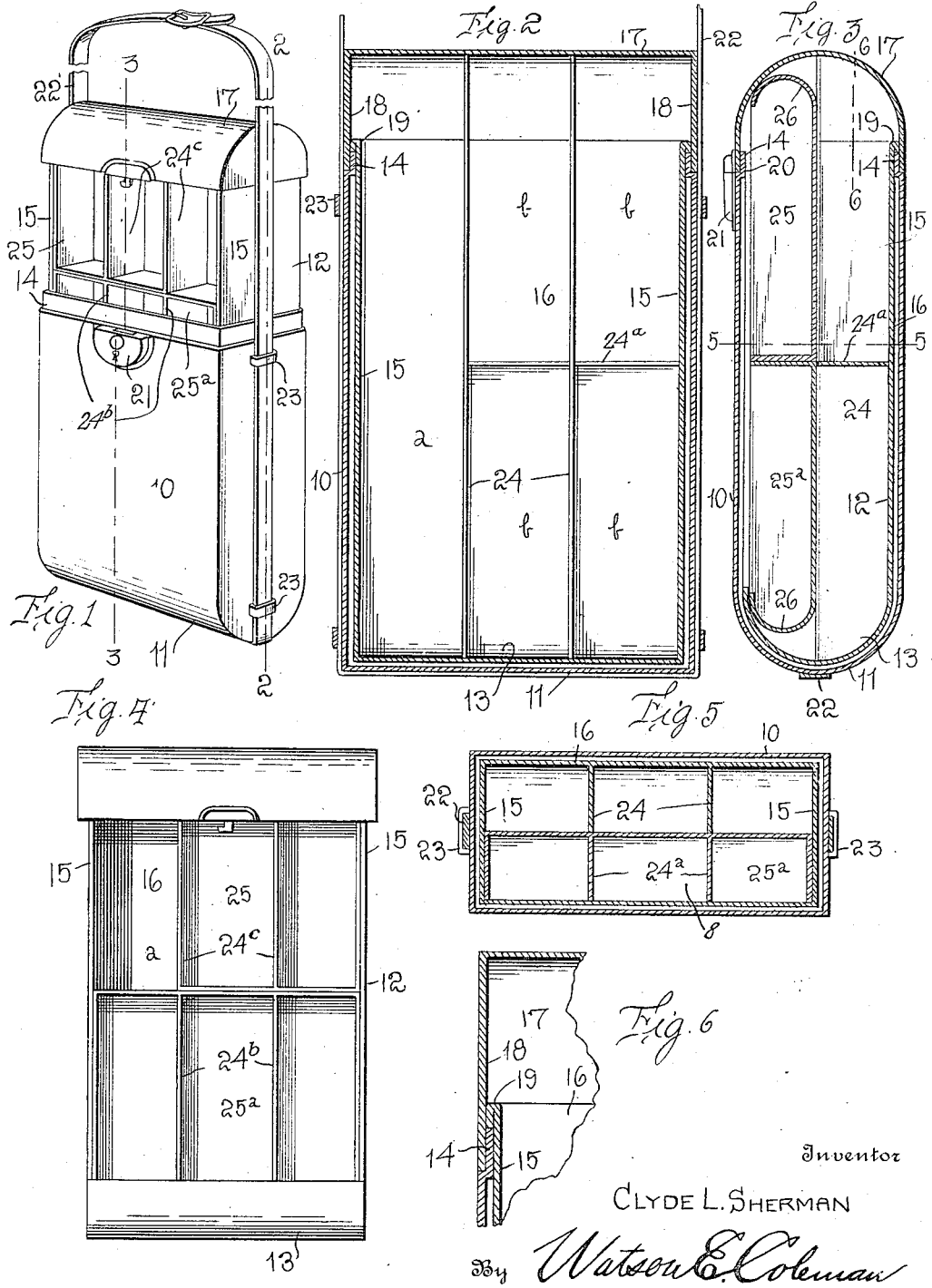

CLYDE L. SHERMAN, OF CORTLAND, NEW YORK.

FISHING-TACKLE BOX.

1,261,861.  Specification of Letters Patent.  Patented Apr. 9, 1918.

Application filed May 12, 1917. Serial No. 168,319.

*To all whom it may concern:*

Be it known that I, CLYDE L. SHERMAN, a citizen of the United States, residing at Cortland, in the county of Cortland and State of New York, have invented certain new and useful Improvements in Fishing-Tackle Boxes, of which the following is a specification, reference being had to the accompanying drawings.

This invention relates to containers, and particularly to boxes for containing fishing tackle adapted to be slung over the shoulder of the fisherman.

The general object of this invention is to provide a very convenient box of this kind, so constructed that it will be convenient to carry and further so constructed that the articles contained therein may be readily secured whenever desired, or replaced in the box.

A further object is to provide a box of this character in which the articles will be thoroughly protected from dampness.

And another object is to provide a box of this character with removable compartment sections, so that access may be secured to every portion of the box.

My invention is illustrated in the accompanying drawings, wherein:—

Figure 1 is a perspective view of a fishing tackle container with the drawer section partly open;

Fig. 2 is a vertical section on the line 2—2 of Fig. 1;

Fig. 3 is a vertical section on the line 3—3 of Fig. 1;

Fig. 4 is a top plan view of the drawer section with the compartments in place;

Fig. 5 is a cross section on the line 5—5 of Fig. 3;

Fig. 6 is a fragmentary sectional view on the line 6—6 of Fig. 3.

Figure 7:
Fig. 7 is a perspective view showing the manner in which my improved tackle box is used.

Referring to these figures, 10 designates the body of the box, which is preferably made of sheet metal, in any desired manner, and has a rounded lower end 11. The opposite end of the body 10 is open for the reception of a drawer 12, the inner end of the drawer being rounded as at 13 to fit the rounded end 11 of the box. The metal of the margin at the open end of the body 10 is inwardly deflected as at 14 and the outer end of the drawer 12 is so formed as to receive and extend over this deflected margin 14. For this purpose the side walls 15 of the drawer 12 and the back wall 16 are not made in one piece with the rounded end 17 of the drawer, but extend into this rounded end 17 in spaced relation to the end walls 18 of the rounded end and in spaced relation to the back wall thereof, as illustrated in Fig. 3, the extremities of these side walls and the bottom wall of the drawer being outwardly turned as at 19 and attached to the corresponding walls of the end 17 by soldering or in any other suitable manner. It will thus be seen that a pocket is formed to receive three walls of the body 10, while the deflected margin 14 of the front wall of the body 10 is received beneath the edge 20 of the end 17.

The body 10 is provided with any suitable lock or latch 21 and the end 17 is provided with a detent adapted to be engaged by said latch. The latch or lock may be of any suitable form. A strap 22 is attached to the sides of the body 10 by means of transverse metallic strips 23, through which the strap easily passes. The strap extends around the lower end 11 of the body 10 and up on each side thereof.

The interior of the drawer 12 is preferably divided into compartments by partition walls 24, which extend upward from the rear wall of the drawer about one-half the thickness of the drawer. As illustrated, there are two longitudinally extending partition walls 24 and one transversely extending partition wall 24ª thus providing an elongated space *a* in which hooks with snells may be disposed and four compartments *b*. Adapted to be disposed within the drawer and rest upon the edges of the partition walls are the two compartment sections 25 and 25ª. One of these compartment sections is shown as divided into three compartments by partition walls 24ᵇ and the other is shown as divided into two compartments by partition walls 24ᶜ. The ends of both of these compartments are rounded as at 26 to fit the rounded ends of the drawer and fit snugly in place therein, as illustrated in Fig. 3. It will be seen that when both of these compartment sections are in place, access may be had to the relatively long compartment *a* without the necessity of removing the compartment sections. Either of these compartment sections may be readily moved however, but when in place the compartment sections engage with each other to prevent any shifting of the compartment sections. The compartment section 25 is narrower than the drawer and, as a consequence, may be shifted laterally. I do not wish to be limited to any particular arrangement of the partitions within these compartment sections or within the drawer itself, as it is obvious that this arrangement may be changed to suit various purposes.

This fishing tackle box is particularly designed for holding artificial lure, reels, lines, flies, and it is obvious that the construction may be made of various sizes depending upon the amount of fishing tackle which the fisherman wishes to carry or the size of the tackle. It is obvious that it may be adapted to various kinds of tackle by changing the various compartments and that the box may be made of various thicknesses and lengths. It is obvious that the curved shape given the ends of the drawer acts to retain the compartment sections or trays in place and that by giving the ends of the drawer this shape and one end of the outer case this shape, that a much stronger structure is provided which will not be readily deformed by usage.

In the use of this device, take the tackle box and hang it on the left side having the strap piece over the right shoulder. If it be desired to open the box and use some of the tackle therein, the box is raised up in front of the operator with the locked side up. The drawer is then pulled out about three-fourths of its length and the small tray 25 is taken out by raising it up in the middle until it will slide back and out. The small tray may then be rested on the outside of the case, then the other tray is taken out and may be set on the outside of the case and access may be had to any part of the tackle box without removing the drawer or setting any part of the box on the ground.

Having thus described my invention, what I claim is:—

1. A fishing tackle box comprising a case rectangular in cross section and open at one end, and a drawer insertible into the case and fitting the same but longer than the case, one end wall of the drawer being formed to provide a closure for the open end of the case, the drawer being divided into a plurality of compartments, the walls of said compartments extending from the bottom of the drawer and being a fraction of the depth of the drawer, and a plurality of trays, each of said trays having a length equal to a fraction of the length of the drawer, said trays when placed together filling the length of the drawer, one of said trays having a width less than the width of the drawer whereby said last named tray may be laterally shifted to disclose one of the compartments beneath the tray.

2. A fishing tackle box comprising a case rectangular in cross section and open at one end, and a drawer insertible into the case and fitting the same but longer than the case, one end wall of the drawer being formed to provide a closure for the open end of the case when the drawer is in place, said drawer being divided into a plurality of compartments, the walls of said compartments extending from the bottom of the drawer and being one-half of the depth of the drawer, and a pair of compartmented trays, each of said trays having a length equal to half the length of the drawer, one of said trays having a width equal to the whole width of the drawer, the other of said trays having a width less than the width of the drawer whereby the last named tray may be laterally shifted to disclose one of the compartments beneath the tray.

3. A fishing tackle box comprising a case rectangular in cross section open at one end, the other end of the case being rounded and a drawer insertible into the case but longer than the case, both end walls of the drawer being rounded, one of said end walls of the drawer being formed to fit over the open end of the case and form a closure for the same, the drawer being divided into a plurality of compartments by walls extending from the bottom of the drawer to approximately one-half the depth of the drawer, and a plurality of compartmented trays together equal in length to the length of the drawer, the outer end walls of said trays being rounded and fitting beneath the rounded end walls of the drawer, whereby to prevent the trays from falling out of the drawer.

In testimony whereof I hereunto affix my signature in the presence of two witnesses.

CLYDE L. SHERMAN.

Witnesses:
   T. C. TOBEY,
   FAY BARTLETT.

Copies of this patent may be obtained for five cents each, by addressing the "Commissioner of Patents, Washington, D. C."